US007947948B2

(12) United States Patent
Schwartz

(10) Patent No.: US 7,947,948 B2
(45) Date of Patent: May 24, 2011

(54) TWO-DIMENSIONAL RADIAL-EJECTION ION TRAP OPERABLE AS A QUADRUPOLE MASS FILTER

(75) Inventor: Jae C. Schwartz, Gilroy, CA (US)

(73) Assignee: Thermo Funnigan LLC, San Jose, CA (US)

( * ) Notice: Subject to any disclaimer, the term of this patent is extended or adjusted under 35 U.S.C. 154(b) by 229 days.

(21) Appl. No.: 12/205,750

(22) Filed: Sep. 5, 2008

(65) Prior Publication Data

US 2010/0059670 A1 Mar. 11, 2010

(51) Int. Cl.
*B01D 59/44* (2006.01)
*H01J 49/26* (2006.01)
*H01J 49/42* (2006.01)

(52) U.S. Cl. ......................... 250/283; 250/281; 250/282

(58) Field of Classification Search .......... 250/281–283, 250/287–290, 292, 299
See application file for complete search history.

(56) References Cited

U.S. PATENT DOCUMENTS 4,736,101 A * 4/1988 Syka et al. .................... 250/292
RE34,000 E * 7/1992 Syka et al. .................... 250/292
5,420,425 A 5/1995 Bier et al.
6,147,348 A * 11/2000 Quarmby et al. ............. 250/292
6,177,668 B1 1/2001 Hager
6,297,500 B1 * 10/2001 Franzen et al. ............... 250/292
6,703,607 B2 3/2004 Stott et al.
6,797,950 B2 9/2004 Schwartz et al.
6,831,275 B2 12/2004 Franzen et al.
7,019,289 B2 * 3/2006 Wang ............................ 250/290
7,141,789 B2 11/2006 Douglas et al.
7,200,728 B2 * 4/2007 Okabayashi et al. ......... 711/165
7,329,866 B2 * 2/2008 Wang ............................ 250/290
7,365,318 B2 4/2008 Schwartz
7,385,193 B2 6/2008 Senko
7,405,399 B2 7/2008 Wells
7,449,686 B2 * 11/2008 Wang et al. ................... 250/292
7,582,865 B2 * 9/2009 Schwartz et al. ............. 250/292
2004/0021072 A1 2/2004 Soudakov et al.
2004/0149903 A1 * 8/2004 Wang ............................ 250/292
2005/0279932 A1 * 12/2005 Wang ............................ 250/290
2007/0164208 A1 7/2007 Quarmby et al.

(Continued)

FOREIGN PATENT DOCUMENTS

EP 1 814 138 A2 8/2007

OTHER PUBLICATIONS

Michael Sudakov et al., “Linear Quadrupoles With Added Octopole Fields,” Rapid Communications In Mass Spectrometry, Wiley InterScience (www.interscience.wiley.com), vol. 17, pp. 2290-2294, (2003).

(Continued)

*Primary Examiner* — Bernard E Souw
(74) *Attorney, Agent, or Firm* — Charles B. Katz

(57) ABSTRACT

A two-dimensional radial-ejection ion trap is constructed from four apertured electrodes having inwardly facing hyperbolic surfaces, with each electrode being spaced from the centerline by a distance r that is greater than the hyperbolic radius $r_0$ defined by the hyperbolic surfaces. This geometry produces a balanced symmetrical trapping field that has a negligible octopole field component and a relatively large dodecapole or icosapolar field component. In one specific implementation, the ion trap is selectably operable as a quadrupole mass filter by applying a filtering DC voltage to the electrodes.

26 Claims, 5 Drawing Sheets

U.S. PATENT DOCUMENTS

| | | | | |
|---|---|---|---|---|
| 2007/0176098 | A1 | 8/2007 | Wells | |
| 2008/0067360 | A1 * | 3/2008 | Senko et al. | 250/290 |
| 2008/0142705 | A1 * | 6/2008 | Schwartz et al. | 250/292 |
| 2008/0210860 | A1 * | 9/2008 | Kovtoun | 250/283 |
| 2008/0302958 | A1 * | 12/2008 | Green | 250/282 |
| 2009/0272898 | A1 * | 11/2009 | Senko et al. | 250/290 |
| 2010/0059666 | A1 * | 3/2010 | Remes et al. | 250/252.1 |
| 2010/0148063 | A1 * | 6/2010 | Schwartz et al. | 250/289 |

OTHER PUBLICATIONS

Donald J. Douglas et al., "Linear Ion Traps In Mass Spectrometry," Mass Spectrometry Reviews, Wiley Periodicals, Inc., vol. 24, pp. 1-29, (2005).

Schwartz et al., "A Two-Dimensional Quadrupole Ion Trap Mass Spectrometer," American Society for Mass Spectrometry 2002, 13, pp. 659-669.

* cited by examiner

TWO-DIMENSIONAL RADIAL-EJECTION ION TRAP OPERABLE AS A QUADRUPOLE MASS FILTER

FIELD OF THE INVENTION

The present invention relates generally to mass spectrometers, and more particularly to a two-dimensional radial-ejection ion trap mass analyzer.

BACKGROUND OF THE INVENTION

Two-dimensional radial-ejection ion traps have been described extensively in the literature (see, e.g., Schwartz et al., "A Two-Dimensional Quadrupole Ion Trap Mass Spectrometer", J. Am. Soc. Mass Spectrometry, 13: 659-669 (2002)) and are widely used for mass spectrometric analysis of a variety of substances, including small molecules such as pharmaceutical agents and their metabolites, as well as large biomolecules such as peptides and proteins. Generally described, such traps consist of four elongated electrodes, each electrode having a hyperbolic-shaped surface, arranged in two electrode pairs aligned with and opposed across the trap centerline. At least one of the electrodes of an electrode pair is adapted with an aperture (slot) extending through the thickness of the electrode in order to permit ejected ions to travel through the aperture to an adjacently located detector. Ions are radially confined within the ion trap interior by applying opposite phases of a radio-frequency (RF) trapping voltage to the electrode pairs, and may be axially confined by applying appropriate DC offsets to end sections or lenses located axially outward of the electrodes or central sections thereof. To perform an analytical scan, a dipole resonant excitation voltage is applied across the electrodes of the apertured electrode pair (often referred to as the X-electrodes because they are aligned with the X-axis of a Cartesian coordinate system, which is oriented such that X and Y are the radial axes of the trap and Z is the longitudinal axis extending along the trap centerline) while the amplitude of the RF trapping voltage is ramped. This causes the trapped ions to come into resonance with the applied excitation voltage in order of their mass-to-charge ratios (m/z's). The resonantly excited ions develop unstable trajectories and are ejected from the trap through the aperture(s) of the X-electrodes to the detectors, which generate signals representative of the number of ejected ions. The detector signals are conveyed to a data and control system for processing and generation of a mass spectrum.

It has long been recognized that the presence of the aperture(s) in the X-electrodes causes distortion in the desired quadrupolar trapping field, in particular adding negative octopolar (where both X-electrodes are apertured) and other higher even-order field components. These field distortions have been found to have operationally significant effects when the ion trap is employed for analytical scanning, including but not limited to ion frequency shifting and degradation of mass accuracy. One way in which ion trap designers have attempted to compensate for aperture-caused field distortions and minimize the associated adverse effects is by outwardly displacing the apertured electrodes (the X-electrodes), such that the apertured electrodes are positioned at a slightly greater distance from the trap centerline relative to the unapertured electrodes. This outward displacement helps cancel (or can invert) the field distortions caused by the apertures in the electrodes. A drawback to this approach (commonly referred to as "stretching" the trap) is that when RF voltages are applied to the electrodes in the normal manner (whereby electrodes of one electrode pair receive a voltage equal in amplitude and opposite in polarity to the electrodes of the other electrode pair), the resultant electric field is not balanced, causing the centerline of the device to exhibit a significant RF potential. When ions are then introduced into the trap interior along the centerline, for a given RF amplitude the acceptance of the ions can be significantly m/z-dependent, which is an undesired behavior. Furthermore, ions in a misbalanced field can effectively oscillate with different frequencies in the X- and Y-dimensions, which eliminates the possibility of conducting phase-locked resonance experiments in both dimensions. In addition, due to the octopolar field component, the oscillation frequency shifts associated with a changing ion trajectory amplitude are in opposite directions for ion motion in the X and Y-dimensions.

Various approaches to balancing the RF field in a radial-ejection two-dimensional ion trap have been proposed in the prior art, including altering the hyperbolic surface profiles of the apertured electrodes to reduce their radii of curvature relative to the non-apertured electrodes (see U.S. patent application Ser. No. 11/437,038 by Senko, entitled "System and Method for Implementing Balanced RF Fields in an Ion Trap Device"), and applying RF voltages of different amplitudes to the apertured and non-apertured electrodes (see U.S. patent application Ser. No. 11/437,087 by Schwartz, also entitled "System and Method for Implementing Balanced RF Fields in an Ion Trap Device"). However, the implementation of these approaches may be difficult in practice and may significantly increase the cost and/or complexity of manufacturing and operating the mass spectrometer instrument.

Accordingly, there remains a need in the mass spectrometry art for a two-dimensional radial ejection ion trap which minimizes or eliminates the adverse performance effects of field distortion arising from the presence of the ejection apertures while maintaining a balanced RF electric field.

SUMMARY OF THE INVENTION

In accordance with an illustrative embodiment, a two-dimensional radial-ejection ion trap is constructed from four elongated electrodes arranged about the trap centerline. Each of the electrodes has an inwardly directed hyperbolic surface defining a hyperbolic radius $r_0$ and a longitudinally extending aperture. The four electrodes are equally spaced from the centerline by a distance r, wherein r is greater than $r_0$, such that both electrode pairs are stretched by equal amounts relative to the "normal" spacing. When a trapping RF voltage is applied to the electrodes in the conventional manner, with one electrode pair receiving an oscillatory voltage that is equal in amplitude and opposite in polarity to the voltage applied to the other electrode pair, a balanced RF field is generated. This balanced field significantly reduces the m/z dependence of the ion injection process and allows ions having a wide m/z range to be injected at the same RF amplitude. In addition, it allows ion injection to be performed at high RF amplitudes (corresponding to high values of the Mathieu parameter q) relative to injection into a conventional unbalanced field, which has advantages relating to space charge capacity, elimination of unwanted low m/z ions, and higher ion frequency dispersion (facilitating higher resolution isolation or ejection of ions during ion injection). A further advantage of an ion trap of the foregoing construction is that the RF field produced thereby does not possess a significant octopolar field component; instead, the principal higher order field component is dodecapolar or icosapolar, which has advantages including that any ion frequency shifting is the same in both radial (X and Y) dimensions. This permits, for example, phase-locked resonance excitation to be performed between the X and Y dimensions.

Another potentially advantageous aspect of an ion trap constructed in accordance with an embodiment of the invention is that its field is symmetrical and more closely approximates that of a conventional round-rod quadrupole mass filter. Thus, the ion trap (alternatively referred to as a multipole structure) may be configured to be selectably operable as a radial-ejection ion trap mass analyzer or (by removing the DC potential well and adding a resolving DC component to the applied RF voltage) as a quadrupole mass filter analyzer. Thus, in another illustrative embodiment, a mass spectrometer is provided having an ion source for generating ions from a sample, a set of ion optics for guiding the ions from the ion source, a multipole device comprising four apertured elongated electrodes having hyperbolic surfaces arranged around the centerline such that each electrode is spaced at a stretched distance r from the centerline, and a controller, coupled to the multipole device, for applying RF and DC voltages to the electrodes to selectively operate the multipole device as a quadrupole mass filter or a two-dimensional radial-ejection ion trap mass analyzer. One specific implementation of this embodiment includes a quadrupole mass filter and a collision cell located upstream in the ion path from the multipole device, so that the mass spectrometer is operable (by adjustment of the RF and DC voltages applied to the multipole device) as a triple quadrupole mass spectrometer or as a hybrid Q-trap mass spectrometer.

DETAILED DESCRIPTION OF EMBODIMENTS

Figure 1:
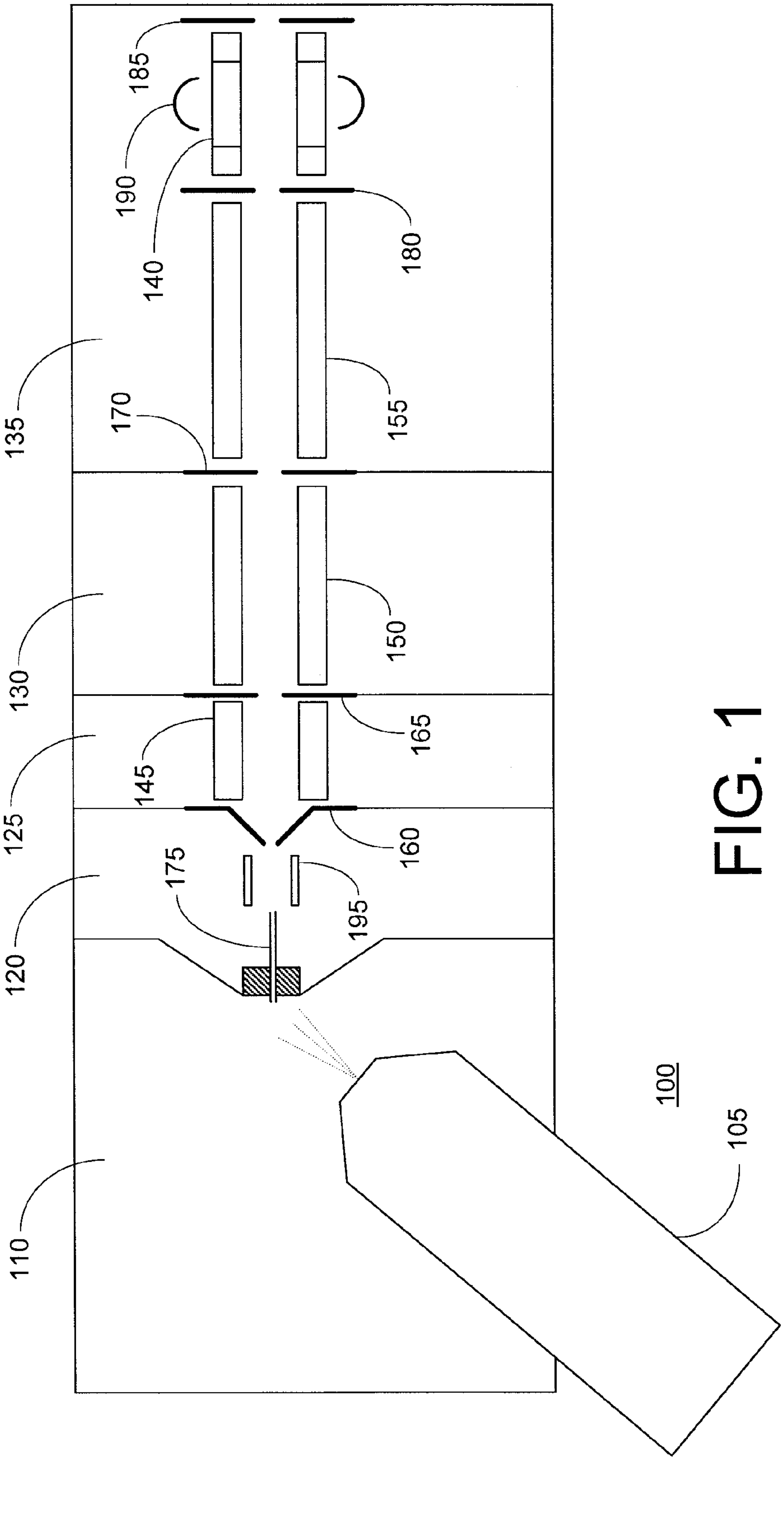
FIG. 1 is a symbolic diagram of a mass spectrometer utilizing a two-dimensional radial-ejection ion trap constructed in accordance with an embodiment of the invention.

FIG. 1 depicts the components of a mass spectrometer 100 in which a two-dimensional radial-ejection ion trap mass analyzer may be implemented, in accordance with an embodiment of the present invention. It will be understood that certain features and configurations of mass spectrometer 100 are presented by way of illustrative examples, and should not be construed as limiting the ion trap mass analyzer to implementation in a specific environment. An ion source, which may take the form of an electrospray ion source 105, generates ions from an analyte material, for example the eluate from a liquid chromatograph (not depicted). The ions are transported from ion source chamber 110, which for an electrospray source will typically be held at or near atmospheric pressure, through several intermediate chambers 120, 125 and 130 of successively lower pressure, to a vacuum chamber 135 in which ion trap 140 resides. Efficient transport of ions from ion source 105 to ion trap 140 is facilitated by a number of ion optic components, including quadrupole RF ion guides 145 and 150, octopole RF ion guide 155, skimmer 160, and electrostatic lenses 165 and 170. Ions may be transported between ion source chamber 110 and first intermediate chamber 120 through an ion transfer tube 175 that is heated to evaporate residual solvent and break up solvent-analyte clusters. Intermediate chambers 120, 125 and 130 and vacuum chamber 135 are evacuated by a suitable arrangement of pumps to maintain the pressures therein at the desired values. In one example, intermediate chamber 120 communicates with a port of a mechanical pump (not depicted), and intermediate pressure chambers 125 and 130 and vacuum chamber 135 communicate with corresponding ports of a multistage, multiport turbomolecular pump (also not depicted). As will be discussed below in further detail, ion trap 140 is provided with axial trapping electrodes 180 and 185 (which may take the form of conventional plate lenses) positioned axially outward from the ion trap electrodes to assist in the generation of a potential well for axial confinement of ions, and also to effect controlled gating of ions into the interior volume of ion trap 140. Ion trap 140 is additionally provided with at least one set of detectors 190 (which may comprise only a single detector) that generate(s) a signal representative of the abundance of ions ejected from the ion trap. A damping/collision gas inlet (not depicted), coupled to a source of an inert gas such as helium or argon, will typically be provided to controllably add a damping/collision gas to the interior of ion trap 140 in order to facilitate ion trapping, fragmentation and cooling.

The operation of the various components of mass spectrometer 100 is directed by a control and data system (not depicted in FIG. 1), which will typically consist of a combination of general-purpose and specialized processors, application-specific circuitry, and software and firmware instructions. The control and data system also provides data acquisition and post-acquisition data processing services.

While mass spectrometer 100 is depicted as being configured for an electrospray ion source, it should be noted that the ion trap 140 may be employed in connection with any number of pulsed or continuous ion sources (or combinations thereof), including without limitation a matrix assisted laser desorption/ionization (MALDI) source, an atmospheric pressure chemical ionization (APCI) source, an atmospheric pressure photo-ionization (APPI) source, an electron ionization (EI) source, or a chemical ionization (CI) ion source. Furthermore, although FIG. 1 depicts an arrangement of ion transfer tube 175, tube lens 195 and electrostatic skimmer 160 for transporting and focusing ions from source chamber 105 to the vacuum regions of mass spectrometer 100, alternative embodiments may employ for this purpose a stacked ring ion guide of the type described in U.S. patent application Ser. No. 12/125,013 to Senko et al. ("Ion Transport Device and Modes of Operation Thereof"), the contents of which are incorporated herein by reference.

Figure 2:
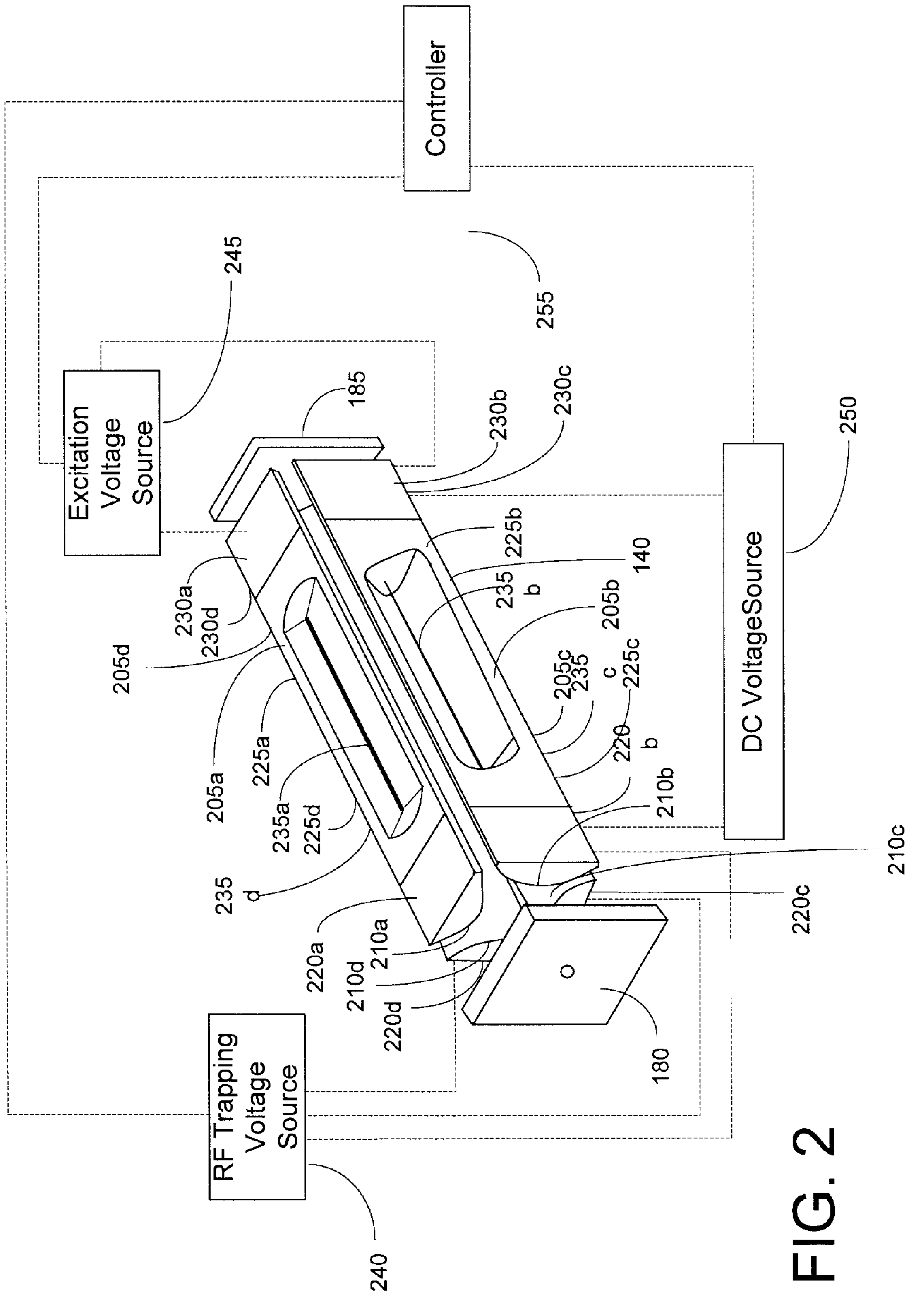
FIG. 2 is a perspective view of the two-dimensional radial-ejection ion trap employed in the mass spectrometer of FIG. 1.

FIG. 2 is a perspective view of ion trap 140. Ion trap 140 includes four elongated electrodes 205*a,b,c,d* arranged in mutually parallel relation about a centerline 210. Each electrode 205*a,b,c,d* has a truncated hyperbolic-shaped surface 210*a,b,c,d* facing the interior volume of ion trap 140. In a preferred implementation, each electrode is segmented into a front end section 220*a,b,c,d*, a central section 225*a,b,c,d*, and a back end section 230*a,b,c,d*, which are electrically insulated from each other to allow each segment to be maintained at a different DC potential. For example, the DC potentials applied to front end sections 220*a,b,c,d* and to back end sections 230*a,b,c,d* may be raised relative to the DC potential applied to central section 225*a,b,c,d* to create a potential well that axially confines positive ions to the central portion of the interior of ion trap 140. Each electrode 205*a,b,c,d* is adapted with an elongated aperture (slot) 235*a,b,c,d* that extends through the full thickness of the electrode to allow ions to be ejected therethrough in a direction that is generally orthogonal to the central longitudinal axis of ion trap 140. Slots 235*a,b,c,d* are typically shaped such that they have a minimum width at electrode surface 210*a,b,c,d* (to reduce field distortions) and open outwardly in the direction of ion ejection. Optimization of the slot geometry and dimensions to minimize field distortion and ion losses is discussed by Schwartz et al. in U.S. Pat. No. 6,797,950 ("Two-Dimensional Quadrupole Ion Trap Operated as a Mass Spectrometer"), the disclosure of which is incorporated herein by reference.

Electrodes 205,*a,b,c,d* (or a portion thereof) are coupled to an RF trapping voltage source 240, excitation voltage source 245, and DC voltage source 250, all of which communicate with and operate under the control of controller 255, which forms part of the control and data system. RF trapping voltage source is configured to apply RF voltages of adjustable amplitude in a prescribed phase relationship to pairs of electrodes 205*a,b,c,d* to generate a trapping field that radially confines ions within the interior of ion trap 140. Excitation voltage source 245 applies an oscillatory excitation voltage of adjustable amplitude and frequency across at least one pair of opposed electrodes to create a dipolar excitation field that resonantly excites ions for the purposes of isolation of selected species, collision induced dissociation, and mass-sequential analytical scanning. During a mass-sequential analytical scan, the excitation and RF trapping voltage amplitudes may be temporally varied in accordance with calibrated relationships experimentally determined by known techniques, or by the technique described in the U.S. patent application by Philip M. Remes et al. entitled "Methods Of Calibrating And Operating An Ion Trap Mass Analyzer To Optimize Mass Spectral Peak Characteristics" and filed on even date herewith, the disclosure of which is incorporated by reference. DC voltage source is operable to apply DC potentials to electrodes 205*a,b,c,d* or sections thereof to, for example, generate a potential well that axially confines ions within ion trap 140. In an alternative configuration, axial confinement is achieved by applying an oscillatory voltage across the electrode end sections or electrodes positioned axially outward of electrodes 205*a,b,c,d* to generate an axial pseudo-potential well. This alternative configuration provides the capability of simultaneous axial confinement of ions of opposite polarities, which is useful for certain ion trap functions, such as electron transfer dissociation (ETD) in which positive analyte ions are reacted with negative reagent ions to yield product ions.

Figure 3:
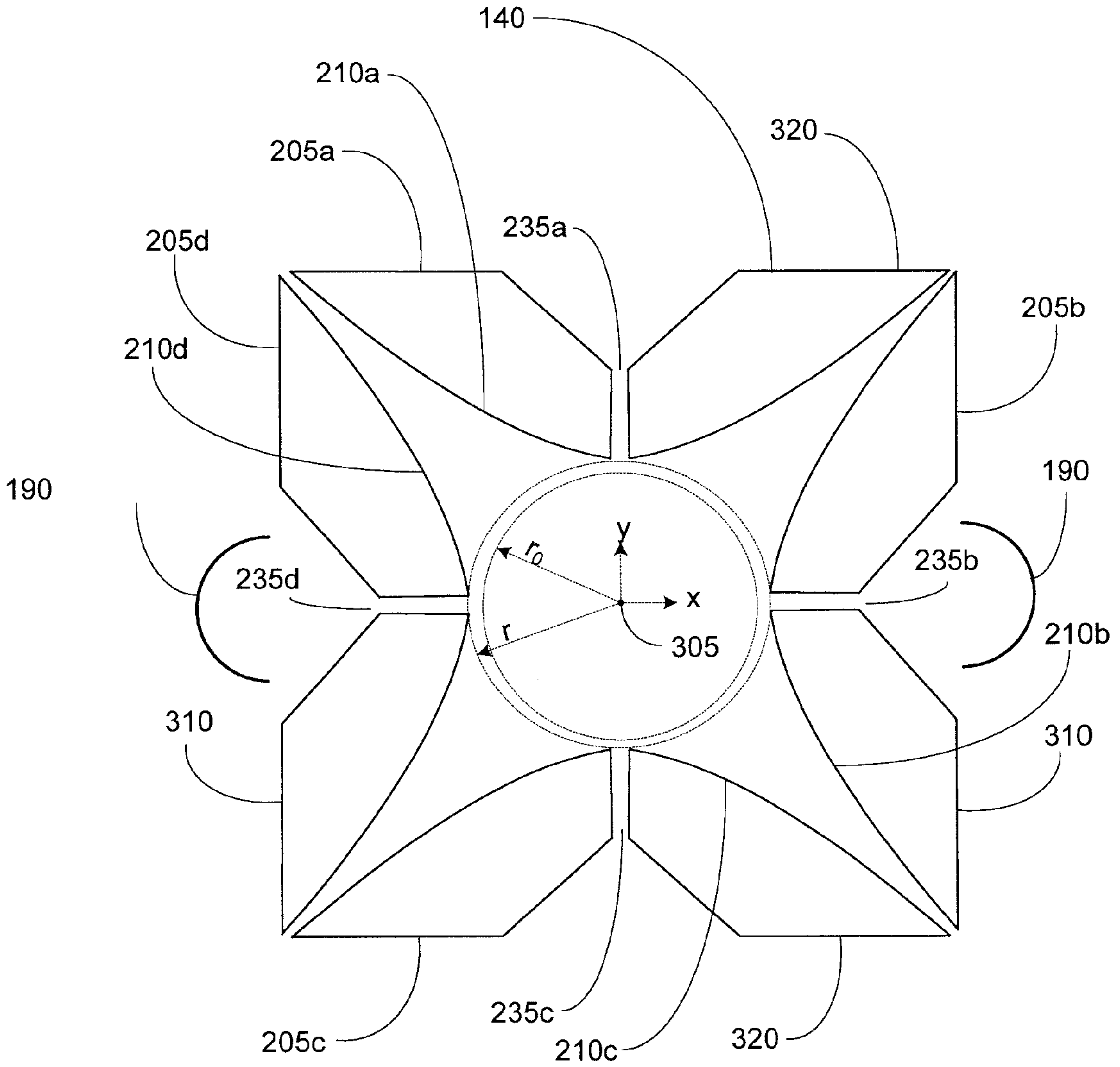
FIG. 3 is a lateral cross-sectional view of the two-dimensional radial-ejection ion trap taken through the central portion of FIG. 2.

FIG. 3 depicts a lateral cross section of ion trap 140 taken through a medial location within central sections 225*a,b,c,d* of electrodes 205*a,b,c,d*. Electrodes 205*a,b,c,d* are arranged into first and second pairs of electrodes, with the electrodes of each pair being located equidistant from and opposed across centerline 305. Because the first and second pairs of electrodes are aligned with, respectively, the X- and Y-axes of a Cartesian coordinate system having its origin located at centerline 305, the first and second pairs of electrodes are respectively referred to herein as the X-electrodes (numbered 310) and Y-electrodes (numbered 320). As noted above, ion trap 140 is conventionally provided with at least one set of detectors 190, positioned adjacent to X-electrodes 310, which receive ions ejected through the apertures of X-electrodes 310 and responsively generate a signal representative of the number of ejected ions. The apex of each electrode 205*a,b,c,d* is located at a distance r (often referred to as the radius of the inscribed circle) from centerline 305. Because r is selected to be greater than the hyperbolic radius $r_0$ of the electrode surfaces (the hyperbolic radius $r_0$ corresponding to the spacing of electrodes from the device centerline that would produce, in the absence of slots 235*a,b,c,d* and truncation of hyperbolic surfaces 210*a,b,c,d*, a pure quadrupolar field), both the X-electrodes 310 and Y-electrodes 320 are considered to be stretched. As is known in the art, the relationship between the shape of electrode surfaces 210*a,b,c,d* and $r_0$ is given by the equation:

$$x^2-y^2=r_0^2$$

for the X-electrode pair 310, and $$x^2-y^2=-r_0^2$$

for the Y-electrodes 320. Stretching X-electrodes 310 and Y-electrodes 320 by equal amounts produces an RF field (upon application of the RF voltages) that possesses X-Y (i.e., four-fold rotational) symmetry and has a zero RF potential at centerline 305. The elimination of the centerline RF potential substantially reduces the m/z dependence of the ion injection process and enables injection of ions having a wide range of m/z's at the same RF trapping voltage amplitude. In addition, the balanced RF field allows ion injection to be conducted at relatively high trapping RF voltage amplitudes (and correspondingly high values of the Mathieu parameter q), which possesses advantages of higher space charge capacity, elimination of unwanted low m/z ions, and higher ion frequency dispersion (which facilitates higher-resolution mass selection during ion injection). In a typical construction, each electrode 205*a,b,c,d* is spaced from the centerline by a distance r equal to at least $1.01*r_0$, and preferably in the range of $1.07*r_0$ to $1.2*r_0$.

The RF field produced within ion trap 140 has a higher-order field component (alternatively referred to as a field distortion) that is primarily dodecapolar with a smaller icosapolar (20-pole) component. As is known in the art, a two-dimensional electric potential $\Phi(x,y,t)$ may be expanded in multipoles $\phi_N(x,y)$ as follows:

$$\Phi(x, y, t) = V(t)\sum_{N=0}^{\infty} A_N\varphi_N(x, y)$$

where V(t) is the voltage applied between an electrode and ground, and $A_N$ is the dimensionless amplitude of the multipole $\phi_N(x,y)$. Conventional radial-ejection two-dimensional ion traps, as well as the axial-ejection round-rod two-dimensional ion traps and multipoles described by Soudakov et al. in U.S. Pat. No. 6,897,438 ("Geometry of Generating a Two-Dimensional Substantially Quadrupolar Field") produce RF fields that exhibit a relatively high octopole amplitude $A_4$; Soudakov et al. prescribe the deliberate introduction of an octopole field component that has an amplitude $A_4$ in the range of 1-4% of the quadrupole field amplitude $A_2$. In contradistinction, the RF field generated by ion trap 140 theoretically has no octopole field component, amplitude $A_4$, but a relatively large dodecapole amplitude $A_6$ and smaller icosapole $A_{10}$ amplitude respectively. The dodecapole field amplitude (and icosapole field) will depend on the degree of stretching of electrode pairs 310 and 320. Typically, the electrodes will be positioned to produce a dodecapole field amplitude of at least 0.2%, and preferably between 0.5 and 0.9% of the quadrupole field amplitude, and an octopole field amplitude of less than 0.001% of the quadrupole field amplitude (which may arise from imprecision in the electrode symmetry). In some cases, the stretch may be such that the dodecapole field is minimized (ideally to zero) while the icosapole (20-pole) field remains.

While the ion trap electrodes are preferably formed with hyperbolic surfaces, other implementations may utilize electrodes having inwardly curved surfaces of different shapes, including "round rod" electrodes of generally cylindrical geometry.

In another embodiment of ion trap 140, only the electrodes of one opposed pair (e.g., X-electrodes 310) are adapted with apertures opening to the exterior of the ion trap. Each electrode of the other opposed pair (e.g., Y-electrodes 320) is instead adapted with a recess or indentation that extends radially outward from the hyperbolic surface but does not traverse the full thickness of the electrode. The recesses will typically have a length approximately equal to the length of the apertures. The cross-sectional geometry of the recesses is selected such that the recesses and apertures affect the RF field in substantially identical manners, i.e., the recesses produce field faults equivalent to those produced by the apertures. This embodiment may be favorable for applications where ions are to be ejected in only one dimension (e.g., the X-dimension).

The balanced, symmetric RF field established within ion trap 140, as well as the presence of apertures in both electrode pairs 310 and 320, enable the use of various techniques and modes of operation that are difficult or impossible to implement in conventional ion traps that have asymmetric trapping fields with a relatively high octopole field component. For example, ions may be resonantly excited in both the X-dimension and Y-dimension, for the purpose of producing ion fragmentation or ejection, by applying oscillatory excitation voltages of identical frequency across X-electrodes 310 and Y-electrodes 320 (in a conventional ion trap, the excitation voltage is applied across a single electrode pair.) Preferably, the excitation voltages are applied in a constant phase relationship of adjustable value. In another example, ions may be mass-sequentially ejected through the apertures of Y-electrodes in addition to the apertures of X-electrodes, and the ions ejected through the Y-electrodes may be detected by an second set of detectors (not depicted) located adjacent thereto. As is described in the aforementioned U.S. Pat. No. 6,797,950 to Schwartz et al., simultaneous analytical scans may be performed at different mass ranges by applying resonant excitation voltages of different frequencies across the X-electrodes and Y-electrodes; for example, an excitation voltage of relatively low frequency may be applied across Y-electrodes 320, resulting in the mass-sequential ejection through the Y-electrodes of ions in a range of fairly high m/z values (e.g., 2000-20,000) while an excitation voltage of fairly high frequency may be applied across X-electrodes 310 to effect mass-sequential ejection through the X-electrodes of ions in a range of fairly low m/z values (e.g., 200-2000). According to a variant of this technique, "artifact" peaks caused by the misassignment of m/z values to ions that are not ejected at the proper value of the Mathieu parameter q (which may occur, for example, if ions undergo fragmentation as they approach the resonance point, if the excitation voltage amplitude is inadequate to eject all ions at their resonance point, or by reformation of analyte ions from clusters) may be eliminated or substantially reduced by applying an excitation voltage across the Y-electrodes at reduced frequency relative to the excitation voltage applied across the X-electrodes (which places $q_y > q_x$). In this manner, ions that have "jumped" over the resonance point associated with ejection in the X-dimension do not reach the detectors located adjacent to X-electrodes 310 (which would result in the generation of an artifact peak), but are instead ejected in the Y-dimension through Y-electrodes 320.

As depicted in FIG. 1, ion trap 140 may constitute the sole mass analyzer of mass spectrometer 100. In other embodiments, ion trap 140 may be combined with one or more separate mass analyzers in a hybrid mass spectrometer architecture to enable serial or parallel analysis of sample ions. For example, ion trap 140 may be combined with an Orbitrap analyzer utilizing the instrument architecture embodied in the LTQ Orbitrap mass spectrometer available from Thermo Fisher Scientific (San Jose, Calif.). In a hybrid mass spectrometer of this general description, ion trap 140 may be employed for both analytical scanning and for manipulation or processing of ion populations (e.g., isolation of ions within a prescribed range of m/z's and/or one or more stages of fragmentation) prior to conveyance of the resultant ions to a downstream mass analyzer for acquisition of a mass spectrum. According to yet another embodiment, ion trap 140 may be arranged adjacent to another two-dimensional ion trap maintained at a different pressure to form a dual-trap mass analyzer, as described in U.S. Patent Application Pub. No. 2008-0142705A1 for "Differential-Pressure Dual Ion Trap Mass Analyzer and Methods of Use Thereof" by Jae C. Schwartz et al., the contents of which are incorporated herein by reference. In the dual-trap mass analyzer, an ion optic is provided to transfer ions between the ion traps such that operations that are more favorably performed at relatively high pressures (e.g., ion cooling and fragmentation) are conducted within the high-pressure ion trap, and operations more favorably performed at relatively low pressures (e.g., m/z isolation and analytical scanning) are conducted within the low-pressure ion trap.

Another advantage of the symmetric construction of ion trap 140 is that it may be operated as a quadrupole mass filter (QMF) to provide m/z-filtering of a continuous or quasi-continuous ion beam. In contrast, a conventional radial ejection ion trap, in which only two of the four electrodes are apertured, is generally not suitable for use as a QMF due to its X-Y asymmetry. Operation of ion trap 140 in QMF mode requires the inclusion of a filtering DC component in the RF voltages applied to electrodes 205*a,b,c,d*, such that one electrode pair (e.g., X-electrode pair 310) receives a potential of $+(U - V \cos \omega t)$ and the other electrode pair (e.g., Y-electrode pair 320) receives a potential of $-(U - V \cos \omega t)$, where U is the filtering DC component, and V is the amplitude of the RF voltage. As is known in the art, the m/z range of the transmitted ions is determined by the values of U and V, and ions having a desired range of m/z values may be selected for transmission by appropriately adjusting the values of U and V. When operated in QMF mode, ion trap 140 may be "parked" by temporally fixing the values of U and V such that only a single ion species is transmitted, or may instead be "scanned" by progressively changing U and/or V such that the m/z of the transmitted ions varies in time. In order to improve the resolution of ion trap 140 when operated in QMF mode, electrodes 205*a,b,c,d* may be lengthened relative to a standard two-dimensional ion trap mass analyzer. Lengthening the electrodes would also provide increased ion storage capacity and hence improved sensitivity when operation in ion trap mode is desired.

Figure 4:
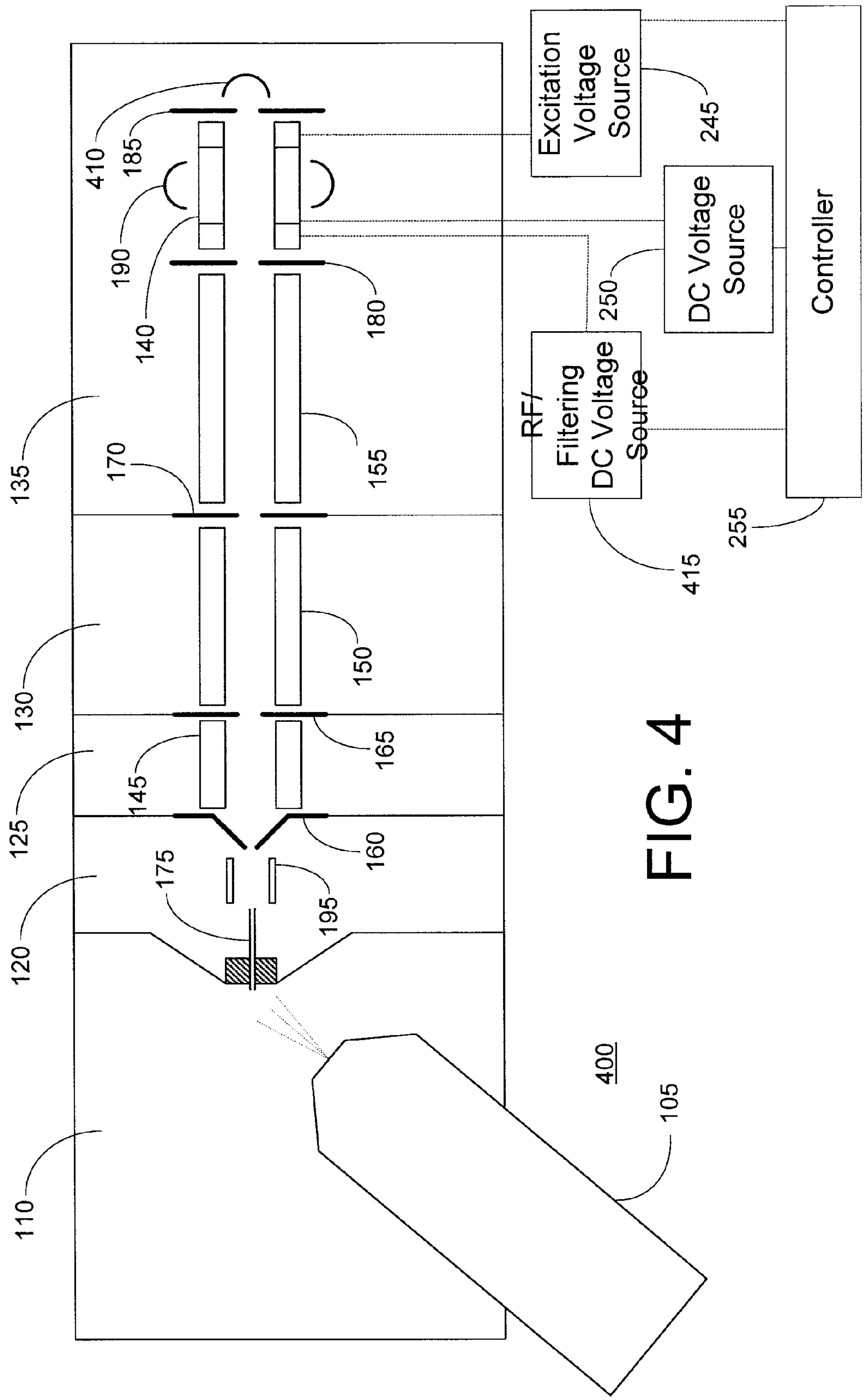
FIG. 4 is a symbolic view of a another mass spectrometer, which includes a multipole structure that is selectively operable as a two-dimensional radial-ejection ion trap or a quadrupole mass filter.

FIG. 4 depicts a mass spectrometer 400 utilizing an ion trap (referred to hereinafter as a multipole device) 140 that is selectively operable in QMF mode. The architecture of mass spectrometer 400 is closely similar to that of mass spectrometer 100 of FIG. 1, with the addition of another detector 410 disposed axially outward of multipole device 140. When it is desirable to operate multipole device 140 in QMF mode, a filtering DC component is added to the RF voltage applied to the multipole device 140 electrodes by RF/DC voltage source 415, in the manner known in the art and described above. Ions enter an inlet end of multipole device 140 as a continuous or quasi-continuous beam. Ions in the selected range of m/z values (selection being achieved by choosing appropriate values of U and V) maintain stable trajectories within the interior of multipole device 140 and leave multipole device 140 via an outlet end thereof, and are thereafter delivered to detector 410, which generates a signal representative of the abundance of transmitted ions. Ions having m/z values outside of the selected range develop unstable trajectories within multipole device 140 and hence do not arrive at detector 410. During operation in QMF mode, DC offsets applied to electrodes 205*a,b,c,d* and axial trapping electrodes 180 and 185 by DC voltage source 155 are set to enable the transport of the selected ions through multipole device 140 to detector 410.

When operation in ion trap mode is desirable, the filtering DC component is removed, and suitable DC offsets are applied to the end sections of electrodes 205*a,b,c,d* and/or to axial trapping electrodes 180 and 185 to establish a potential well that enables trapping of ions within the interior volume of multipole device 140. The ions may then be subjected to one or more stages of isolation and fragmentation, if desired, and the ions or their products may be mass analyzed by resonantly ejecting the ions to detectors 190, in accordance with known techniques. According to one preferred implementation, the frequency of the excitation voltage applied by excitation voltage source 250 during an analytical scan is equal to one-half or one-third of the frequency of the RF trapping voltage, and the phase of the excitation voltage is locked to the RF trapping voltage such that the phase relationship is maintained at a constant preselected value during the scan. Those skilled in the art will recognize that the value of the Mathieu parameter q at which ions are ejected will depend on the ratio of the frequencies of the excitation and RF trapping voltages. So as to provide extended mass operation, i.e., the ability to detect ions over a larger range of m/z's, the excitation voltage frequency may be set to a relatively small integer fraction, e.g. 1/7, of the trapping voltage frequency. In order to provide acceptable trapping efficiencies and to enable collision induced fragmentation during operation in the ion trap mode, a damping/collision gas may be added to the interior of multipole device 140 during its operation in ion trap mode. When multipole device 140 is switched to QMF mode, the damping/collision gas may be pumped away such that the interior volume is maintained at a low pressure conducive to good filtering performance.

In one particularly favorable implementation, multipole device 140 may be automatically switched between ion trap and QMF modes in a data-dependent manner, whereby the acquisition of mass spectral data that satisfies specified criteria triggers mode switching. For example, multipole device 140 may initially be operated in QMF mode to provide single ion monitoring (SIM) of an ion species of interest. When detector 410 generates a signal indicative of the presence of the ion species of interest, multipole device 140 may be automatically switched to operation in ion trap mode in order to perform MS/MS or $MS^n$ analysis for confirmation of the identification of the ion species of interest or to provide structural elucidation.

Figure 5:
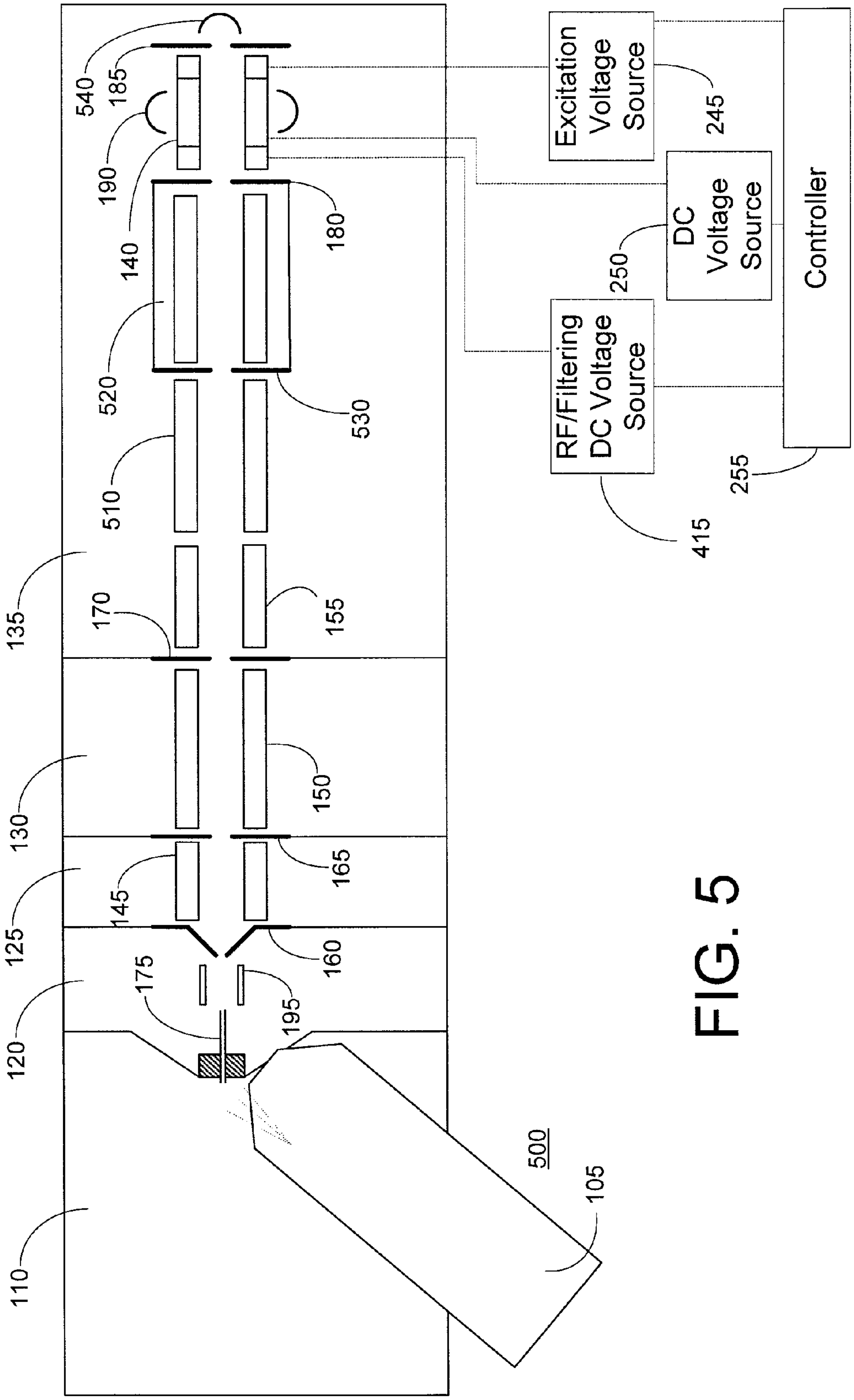
FIG. 5 is a symbolic view of a variation on the mass spectrometer depicted in FIG. 4, wherein a quadrupole mass filter and a collision cell are placed upstream in the ion path from the multipole device, such that the mass spectrometer is selectively operable in triple quadrupole or Q-trap analysis modes.

FIG. 5 depicts another mass spectrometer 500, in which multipole device 140 is placed downstream of a quadrupole mass filter (QMF) 510 and a collision cell 520. QMF 510 may take the form of a conventional multipole structure operable to selectively transmit ions within an m/z range determined by the applied RF and DC voltages. Collision cell 520 may also be constructed as a conventional multipole structure to which an RF voltage is applied to provide radial confinement. The interior of collision cell 520 is pressurized with a suitable collision gas, and the kinetic energies of ions entering collision cell 520 may be regulated by adjusting DC offset voltages applied to QMF 510, collision cell 520 and lens 530. As described above, multipole device 140 is selectably operable in an ion trap mode or a QMF mode and may be switched between the modes by adjusting or removing the RF, filtering DC, and DC offset voltages applied to electrodes 205*a,b,c,d* and axial trapping electrodes 180 and 185, and by adding or removing collision/damping gas to or from the interior volume.

When multipole device 140 is operated in QMF mode, mass spectrometer 500 functions as a conventional triple quadrupole mass spectrometer, wherein ions are selectively transmitted by QMF 510, fragmented in collision cell 520, and the resultant product ions are selectively transmitted by multipole device 140 to detector 540. Samples may be analyzed using standard techniques employed in triple quadrupole mass spectrometry, such as precursor ion scanning, product ion scanning, single- or multiple reaction monitoring, and neutral loss monitoring, by applying (either in a fixed or temporally scanned manner) appropriately tuned RF and DC voltages to QMF 510 and multipole device 140.

Switching multipole device 140 to ion trap mode (which may be done in a data-dependent manner, as discussed above in connection with the FIG. 4 embodiment) causes mass spectrometer 500 to function as a QMF-ion trap instrument (commonly referred to in the art as a "Q-trap"). Ions are selectively transmitted through QMF 510 and undergo collision induced dissociation in collision cell 520. The resultant product ions are delivered to multipole device 140 for trapping, manipulation and mass analysis. In one illustrative example, the product ions delivered to multipole device 140 may be subjected to one or more additional stages of fragmentation in order to provide confirmation of the identification of an ion species of interest. As described above, acquisition of a mass spectrum may be performed by resonantly ejecting the ions to detectors 190 in accordance with known techniques.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A two-dimensional ion trap mass analyzer, comprising:

four elongated rod electrodes each having a hyperbolic surface of hyperbolic radius $r_0$ facing a centerline and an aperture extending through the thickness of the electrode;

the four rod electrodes being equally spaced from the centerline by a distance r, wherein r is greater than the hyperbolic radius $r_0$; and an RF voltage source for applying an RF trapping voltage to the rod electrodes to generate an RF trapping field that radially confines ions to the interior of the ion trap; and a DC voltage source for applying DC offsets to the rod electrodes or a set of axial trapping electrodes positioned outward of the rod electrodes to generate a potential well that axially confines ions within the interior of the ion trap.

2. The ion trap mass analyzer of claim 1, wherein the ratio of r to $r_0$ is at least 1.01.

3. The ion trap mass analyzer of claim 1, wherein the ratio of r to $r_0$ is between 1.07 and 1.20.

4. The ion trap mass analyzer of claim 1, wherein the RF trapping field has a dodecapolar component having an amplitude of at least 0.2 percent of the amplitude of the quadrupolar component of the RF trapping field.

5. The ion trap mass analyzer of claim 1, wherein:

the RF voltage source is selectably operable to apply a filtering DC component to the rod electrodes; and the DC voltage source is selectably operable to apply or remove DC offsets to or from at least some of the rod electrodes or the axial trapping electrodes to permit selected ions to longitudinally traverse the ion trap mass analyzer;

whereby the ion trap mass analyzer is selectably operable as a mass filter.

6. The ion trap mass analyzer of claim 1, further comprising a set of detectors, each detector being positioned proximal to a corresponding aperture.

7. The ion trap mass analyzer of claim 5, wherein the rod electrodes extend between an inlet end and an outlet end, and further comprising a detector positioned proximal to the outlet end.

8. The ion trap mass analyzer of claim 1, further comprising an oscillatory resonant excitation voltage source, separate from the RF voltage source, for applying a first resonant excitation voltage across a first opposed pair of rod electrodes.

9. The ion trap mass analyzer of claim 8, wherein the oscillatory resonant excitation voltage source is configured to apply a second resonant excitation voltage across a second opposed pair of rod electrodes, the first resonant excitation voltage differing from the second resonant excitation voltage in at least one of frequency and phase.

10. The ion trap mass analyzer of claim 8, wherein the first resonant excitation voltage has a frequency equal to ⅓ of the frequency of the RF trapping voltage.

11. A mass spectrometer, comprising:

an ion source for generating ions from a sample to be analyzed;

at least one ion optic for guiding the ions produced by the ion source; and a two-dimensional ion trap mass analyzer positioned to receive ions from the at least one ion optic, the ion trap mass analyzer comprising:

a first ion trap structure including four elongated rod electrodes each having a hyperbolic surface of hyperbolic radius $r_0$ facing a centerline and an aperture extending through the thickness of the electrode;

the four rod electrodes being equally spaced from the centerline by a distance r, wherein r is greater than the hyperbolic radius $r_0$;

an RF voltage source for applying an RF trapping voltage to the rod electrodes to generate an RF trapping field that radially confined ions to the interior of the ion trap; and a DC voltage source for applying DC offsets to the rod electrodes or a set of axial trapping electrodes positioned outward of the rod electrodes to generate a potential well that axially confines ions within the interior of the ion trap.

12. The mass spectrometer of claim 11, wherein the ratio of r to $r_0$ is at least 1.01.

13. The mass spectrometer of claim 11, wherein the ratio of r to $r_0$ is between 1.07 and 1.20.

14. The mass spectrometer of claim 11, wherein the RF trapping field has a dodecapolar component having an amplitude of at least 0.2 percent of the amplitude of the quadrupolar component of the RF trapping field.

15. The mass spectrometer of claim 11, wherein:

the RF voltage source is selectably operable to apply a filtering DC component to the rod electrodes; and the DC voltage source is selectably operable to apply or remove DC offsets to or from at least some of the rod electrodes or the axial trapping electrodes to permit selected ions to longitudinally traverse the ion trap mass analyzer;

whereby the ion trap mass analyzer is selectably operable as a mass filter.

16. The mass spectrometer of claim 11, further comprising a set of detectors, each detector being positioned proximal to a corresponding aperture.

17. The mass spectrometer of claim 15, wherein the rod electrodes extend between an inlet end and an outlet end, and further comprising a detector positioned proximal to the outlet end.

18. The mass spectrometer of claim 11, further comprising an oscillatory resonant excitation voltage source, separate from the RF voltage source, for applying a first resonant excitation voltage across a first opposed pair of rod electrodes.

19. The mass spectrometer of claim 18, wherein the oscillatory resonant excitation voltage source is configured to apply a second resonant excitation voltage across a second opposed pair of rod electrodes, the first resonant excitation voltage differing from the second resonant excitation voltage in at least one of frequency and phase.

20. The mass spectrometer of claim 18, wherein the first resonant excitation voltage has a frequency equal to ⅓ of the frequency of the RF trapping voltage.

21. The mass spectrometer of claim 15, further comprising:

a quadrupole mass filter located upstream in the ion path from the ion trap mass analyzer; and a collision/reaction cell located intermediate in the ion path between the quadrupole mass filter and the ion trap mass analyzer;

whereby the mass spectrometer is selectably operable in triple quadrupole or q-trap modes.

22. The mass spectrometer of claim 11, wherein the ion trap mass analyzer includes a second ion trap structure positioned adjacent the first ion trap structure and an ion lens for transferring ions between the first and second ion trap structures, the interior volumes of the first and second ion trap structures being maintained at different pressures during operation of the mass spectrometer.

23. A multipole structure for connection to an RF voltage source, comprising:

four elongated rod electrodes arranged about a centerline of the multipole structure, each of the elongated electrodes having a curved surface facing an interior of the multipole structure and a longitudinally extending aperture or recess;

the electrodes being spaced from the centerline by a distance r such that, when opposite phases of an RF voltage are applied to opposed pairs of the electrodes, the resultant RF field has an octopolar component of not more than 0.001%.

24. The multipole structure of claim 23, wherein the RF field has a dodecapolar component of at least 0.2%.

25. The multipole structure of claim 24, wherein the resultant RF field has a dodecapolar component in the range of 0.5% to 0.9%.

26. A two-dimensional ion trap mass analyzer, comprising:

four elongated rod electrodes each having a hyperbolic surface of a hyperbolic radius $r_0$ facing a centerline, the rod electrodes being arranged into first and second opposed electrode pairs;

the electrodes of the first electrode pair being adapted with apertures permitting the ejection of ions therethrough, and the electrodes of the second electrode pair being adapted with recesses that do not extend through the full thicknesses of the electrodes;

the four rod electrodes being equally spaced from the centerline by a distance r, wherein r is greater than the hyperbolic radius $r_0$; and an RF voltage source for applying an RF trapping voltage to the rod electrodes to generate an RF trapping field that radially confines ions to the interior of the ion trap; and a DC voltage source for applying DC offsets to the rod electrodes or a set of axial trapping electrodes positioned outward of the rod electrodes to generate a potential well that axially confines ions within the interior of the ion trap.

* * * * *